United States Patent Office 3,419,600
Patented Dec. 31, 1968

---

3,419,600
NOVEL NITRO- AND AMINO-ARYLALKOXY-HYDROQUINONES
Milton Green and Warren E. Solodar, Newton Center, Mass., assignors to Polaroid Corporation, Cambridge, Mass., a corporation of Delaware
No Drawing. Filed Apr. 15, 1964, Ser. No. 360,139
20 Claims. (Cl. 260—479)

This invention relates to novel chemical compounds and more particularly to certain novel chemical compounds useful in the development of photosensitive silver halide elements.

One object of this invention is to provide novel chemical compounds and the syntheses for their preparation.

Another object of this invention is to provide novel photographic developing agents, products, compositions and processes for the development of silver halide emulsions.

Other objects of this invention will in part be obvious and will in part appear hereinafter.

The invention accordingly comprises the processes involving the several steps and the relation and order of one or more of such steps with respect to each of the others, ans the products and compositions possessing the features, properties and the relation of elements which are exemplified in the following detailed disclosure, and the scope of the application of which will be indicated in the claims.

For a fuller understanding of the nature and objects of the invention, reference should be had to the following detailed description.

The novel compounds to which this invention is directed have been found to be useful as silver halide developing agents and as intermediates in preparing dye developers.

The compounds of this invention may be prepared by a process comprising the steps of: (1) reacting a diaralkoxy compound of the formula:

(A)

wherein each Z is an alkyl group, preferably a lower alkyl such as methyl or ethyl, or a halogen such as chlorine; $m$ is a positive integer from 1 to 4, inclusive; and $Y^1$ is a para-diaralkoxy or an ortho-diaralkoxy phenyl group, with a compound of the formula:

(B)

wherein Ar is an aryl nucleus such as a benzene or naphthalene nucleus; $n$ is a positive integer from 1 to 5, inclusive; X is an alkylene group containing at least 2 carbons, i.e., a —CH$_2$—CH$_2$— group, and preferably an alkylene group containing from 2 to 6 carbons, inclusive; $R^1$ is a suitable halogen, preferably bromine, to form a compound of the formula:

(C)
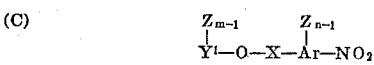

(2) reacting the resultant product with a debenzylating agent such as a halogen acid, e.g., hydrochloric acid or a boron trihalide, aluminum halide, etc., to form a compound of the formula:

(D)
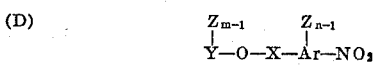

wherein Y is a para-dihydroxy or an ortho-dihydroxy phenyl group; (3) reacting the resultant product with an acyl halide, preferably acetyl chloride or benzoyl chloride, and an acid, such as sulfuric acid, to form a compound of the formula:

(E)
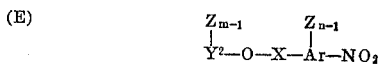

wherein $Y^2$ is a para-diacyloxy or an ortho-diacyloxy phenyl group; (4) reducing the resultant product by well-known hydrogenation procedures to form a compound of the formula:

(F)

wherein $Y^2$ has the same meaning as heretofore noted in Formula E; and (5) hydrolyzing the resultant product by procedures well-known in the art to form a substituted aralkyl aryl ether of the formula:

(G)
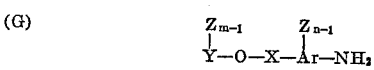

wherein Y has the same meaning as heretofore noted in Formula D.

It will be appreciated that in Formulae B, C, D, E, F and G, X, $Y^1$, Ar, Z, $m$ and $n$ have the meanings heretofore noted.

By the term "aralkoxy" is meant the grouping $R^2$—O—, wherein $R^2$ is an aralkyl group, e.g., a benzyl group.

By the term "acyloxy" is meant the grouping R—COO—, wherein R is an aliphatic, aryl or aralkyl group, preferably containing 1 to 7 carbons. In the preferred embodiment, R is —CH$_3$, and the acyloxy group is an acetoxy group. However, R may be an aryl group, e.g., a phenyl group; hence, the acyloxy group would then be a benzoxy group.

As illustrations of suitable alkylene radicals comprehended by X, mention may be made of radicals such as —CH$_2$—CH$_2$—, —CH$_2$—CH$_2$—CH$_2$—,

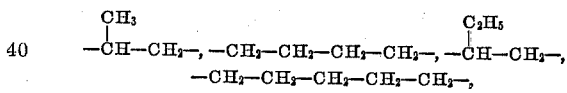

—CH$_2$—CH$_2$—CH$_2$—CH$_2$—CH$_2$—CH$_2$—, etc. The alkylene radical X must contain at least 2 carbons (—CH$_2$—CH$_2$—) to avoid cleavage in the debenzylation step 2.

It will be appreciated that the nitro group of the haloalkyl substituted nitrobenzene or nitronaphthalene of Formula B may be in any position on the aryl nucleus, including the meta-position, since the reactivity of the halogen is essentially independent of any substituents on the aromatic ring.

While the preferred acyl halide is acetyl chloride, other acyl halides may be employed, e.g., benzoyl chloride, propionyl chloride, trichloroacetyl chloride, etc.

The addition of an acid, such as sulfuric acid, in the acylation step 3 is merely to provide a catalyst. Suitable acids will be apparent to those skilled in the chemical art.

Suitable hydrogenation catalysts useful in the practice of the invention are well known in the art and per se comprise no part of the present invention. As examples of useful catalysts, mention may be made of palladium-on-charcoal, palladium-on-barium sulfate, Raney nickel, etc.

Where the secondary or tertiary amine derivatives are desired, the amino group may be suitably alkylated in accordance with well-known procedures, preferably before removing the protective groups from the hydroxyl groups.

The present invention will be more readily understood by the following equations and description illustrating the preparation of 4'-aminophenylpropoxy-hydroquinone.

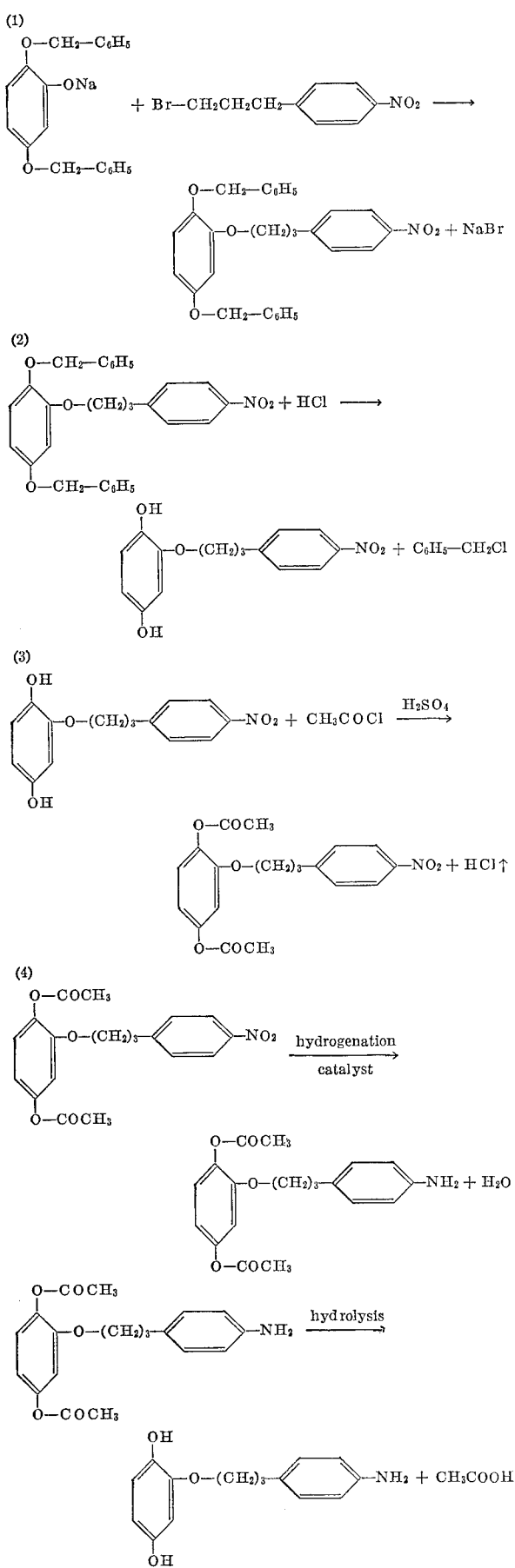

As the ester derivative formed in the acylation step 3 is a solid, hydrogenation step 4 is preferably performed in the presence of a suitable organic solvent. Other steps in the synthesis, e.g., steps 2 and 3, also may employ organic solvents. Suitable inert organic solvents, i.e., solvents which are chemically inert to both the reactants and the reaction product, will be readily suggested to those skilled in the art. As examples of such solvents, mention may be made of acids like acetic acid or esters thereof, e.g., ethyl acetate, propyl acetate, etc., or alcohols, e.g., methanol, ethanol, etc.

The particular reaction conditions not specifically described herein, e.g., temperature, pressure, etc., are not critical in the practice of this invention and will be readily apparent to those skilled in the art.

In the preferred embodiment, it has been found to be advantageous not to isolate the hydrogenation product of step 4 as the free amine. The application of heat during the evaporation of solvent following the reduction may lead to amine-ester interaction, with attendant loss of product. For this reason and because of the potential use of the diacyloxy compounds as intermediate in preparing dye developers, it is preferred to isolate the reduction product in the form of an acid addition salt. In other words, in the preferred embodiment, before the product of the hydrogenation step is subjected to hydrolysis step 5, the addition of an acid, e.g., hydrochloric acid, permits formation of the more stable acid addition salt of the desired material, which salt may be employed, without further treatment, in the synthesis of dye developers.

Furthermore, if the diacetoxy compounds of this invention are to be stored for any length of time, it is preferable to keep them in the form of the acid addition salt, e.g., to prevent shifting of an acyl group from a hydroxy group to the amino group.

It will be appreciated that the compounds of Formula G, e.g., 4-aminophenylpropoxy hydroquinone, also may be prepared by hydrogenation, in the presence of a palladium-barium sulfate catalyst, of the corresponding nitro compound of Formula D, e.g., 4'-nitrophenylpropoxyhydroquinone, or alternatively by hydrolysis of the corresponding compounds of Formula F, e.g., 4'-aminophenylpropoxy hydroquinone O,O-diacetate.

It will be noted that the intermediate products found in steps 1, 2, 3, 4 and 5 are novel compounds and may be easily isolated. The products of steps 4 and 5 are isolated in the acid addition salt form as heretofore mentioned.

As examples of novel compounds within the scope of Formula C, mention may be made of the following:

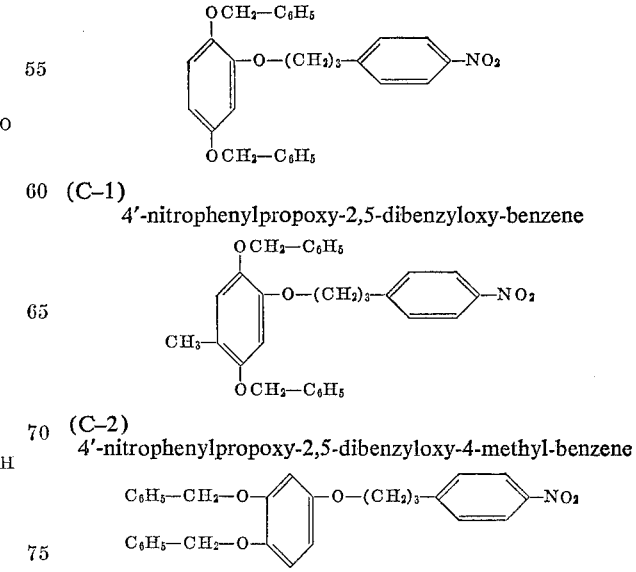

(C-1) 4'-nitrophenylpropoxy-2,5-dibenzyloxy-benzene (C-2) 4'-nitrophenylpropoxy-2,5-dibenzyloxy-4-methyl-benzene (C-3) 4'-nitrophenylpropoxy-3,4-dibenzyloxy-benzene

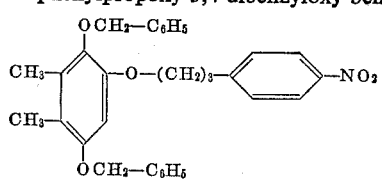

(C-4) 4'-nitrophenylpropoxy-2,5-dibenzyloxy-3,4-dimethyl-benzene

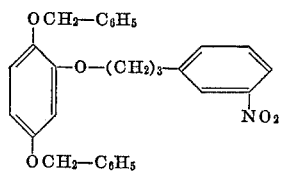

(C-5) 3'-nitrophenylpropoxy-2,5-dibenzyloxy-benzene

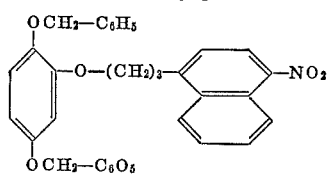

(C-6) 4'-nitronaphthylpropoxy-2,5-dibenzyloxy-benzene

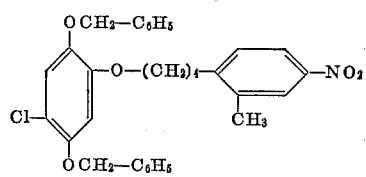

(C-7) 2'-methyl-4'-nitrophenylbutoxy-4-chloro-2,5-dibenzyloxy-benzene

As examples of novel compounds within the scope of Formula D, mention may be made of the following:

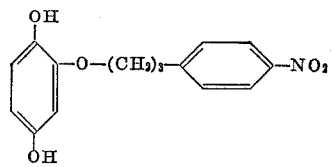

(D-1) 4'-nitrophenylpropoxy-hydroquinone

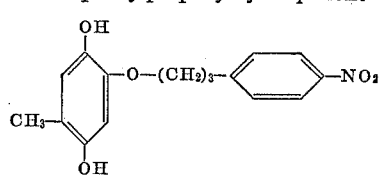

(D-2) 4'-nitrophenylpropoxy-4-methyl-hydroquinone

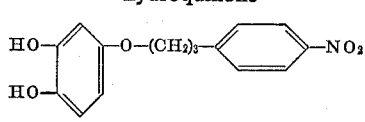

(D-3) 4'-nitrophenylpropoxy-3,4-dihydroxy-benzene

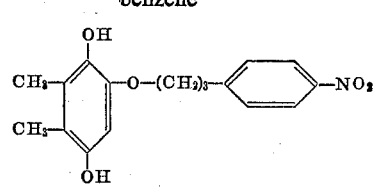

(D-4) 4'-nitrophenylpropoxy-3,4-dimethyl-hydroquinone

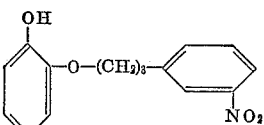

(D-5) 3'-nitrophenylpropoxy-hydroquinone

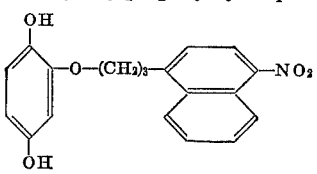

(D-6) 4'-nitronaphthylpropoxy-hydroquinone

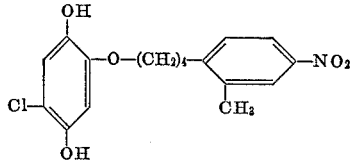

(D-7) 2'-methyl-4'-nitrophenylbutoxy-4-chloro-hydroquinone

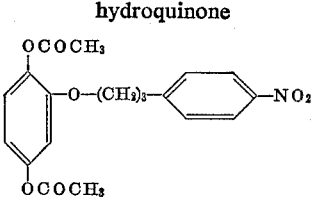

As examples of novel compounds within the scope of Formula E, mention may be made of the following:

(E-1) 4'-nitrophenylpropoxy-2,5-diacetoxy-benzene

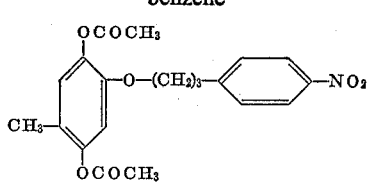

(E-2) 4'-nitrophenylpropoxy-2,5-diacetoxy-4-methyl-benzene

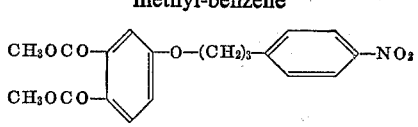

(E-3) 4'-nitrophenylpropoxy-3,4-diacetoxy-benzene

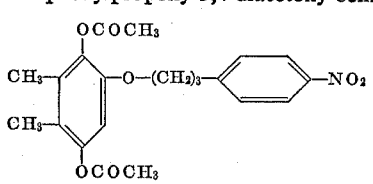

(E-4) 4'-nitrophenylpropoxy-2,5-diacetoxy-3,4-dimethyl-benzene

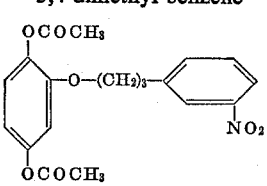

(E-5) 3'-nitrophenylpropoxy-2,5-diacetoxy-benzene

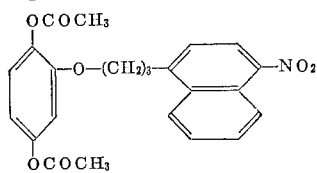

(E-6) 4'-nitronaphthylpropoxy-2,5-diacetoxy-benzene

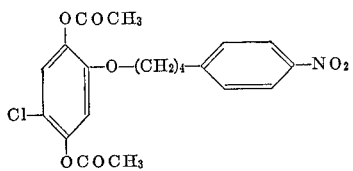

(E-7) 4'-nitrophenlybutoxy-4-chloro-2,5-diacetoxy-benzene

As examples of novel compounds within the scope of Formula F, mention may be made of the following:

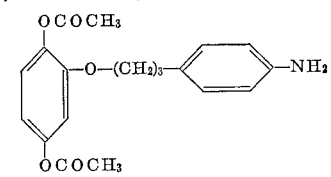

(F-1) 4'-aminophenylpropoxy-2,5-diacetoxy-benzene

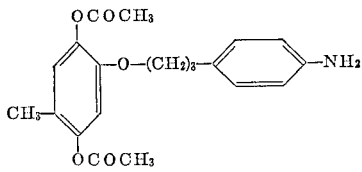

(F-2) 4'-aminophenylpropoxy-2,5-diacetoxy-4-methyl-benzene

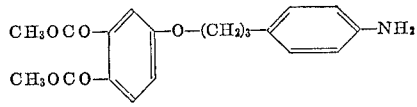

(F-3) 4'-aminophenylpropoxy-3,4-diacetoxy-benzene

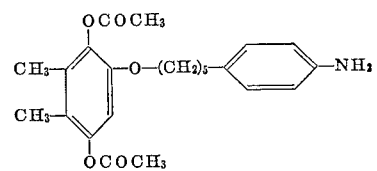

(F-4) 4'-aminophenylpentoxy-2,5-diacetoxy-3,4-dimethyl-benzene

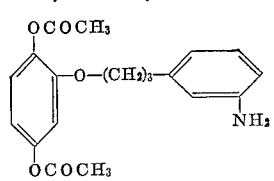

(F-5) 3'-aminophenylpropoxy-2,5-diacetoxy-benzene

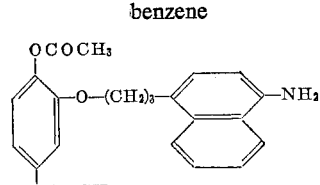

(F-6) 4'-aminonaphthylpropoxy-2,5-diacetoxy-benzene

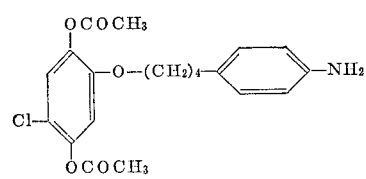

(F-7) 4'-aminophenylbutoxy-4-chloro-2,5-diacetoxy-benzene

As examples of novel compounds within the scope of Formula G, mention may be made of the following:

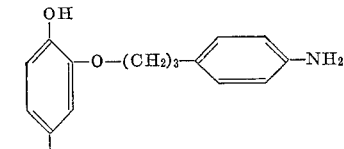

(G-1) 4'-aminophenylpropoxy-hydroquinone

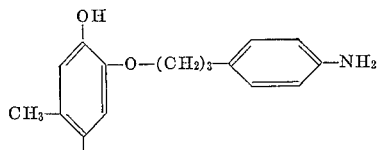

(G-2) 4'-aminophenylpropoxy-4-methyl-hydroquinone

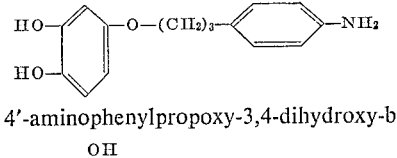

(G-3) 4'-aminophenylpropoxy-3,4-dihydroxy-benzene

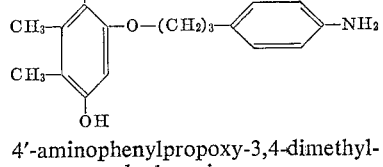

(G-4) 4'-aminophenylpropoxy-3,4-dimethyl-hydroquinone

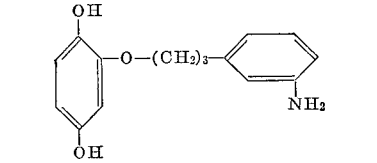

(G-5) 3'-aminophenylpropoxy-hydroquinone

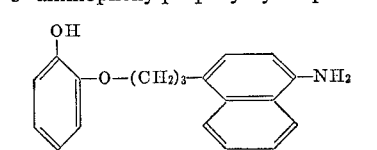

(G-6) 4'-aminonaphthylpropoxy-hydroquinone

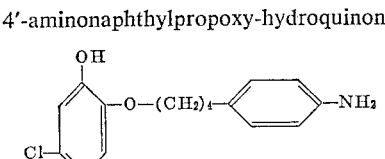

(G-7) 4'-aminophenylbutoxy-4-chloro-hydroquinone

The examples which follow are intended to be illustrative and not to limit this invention.

EXAMPLE 1

Preparation of sodium 2,5-dibenzyloxyphenolate

A mixture of 30.4 grams of acetylhydroquinone (0.2 M), 119.9 grams of benzyl iodide (0.55 M), 450 ml. of acetone and 124.4 grams of anhydrous potassium carbonate (0.9 M) was refluxed for 36 hours, keeping the reaction mixture blanketed with nitrogen throughout the reaction. The acetone was distilled off and the residue crystallized from ethanol to give a 66% yield of 2,5-dibenzyloxyacetophenone as white crystals which melted at 72–76° C., and had the following structural formula:

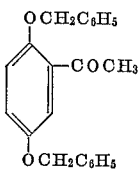

The following analysis was obtained:
Calculated: C, 79.5; H, 6.0. Found: C, 79.2; H, 5.8.

A mixture of 16.6 grams (0.05 M) of 2,5-dibenzyloxyacetophenone (prepared in the foregoing manner), 40 ml. of acetic acid and 11.5 grams of 40% peracetic acid was heated at 60° C. with stirring for 0.5 hour. The resulting mixture was cooled and the product filtered off to a 60.5% yield of 2,5-dibenzyloxyphenyl acetate as white crystals which melted at 121–124° C., and had the following structural formula:

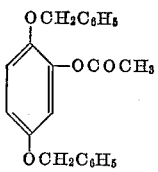

Recrystallization from ethanol gave a sample which analyzed as follows:
Calculated: C, 75.8; H, 5.7. Found: C, 75.6; H, 5.6.

A mixture of 17.4 grams (0.05 M) of 2,5-dibenzyloxyphenyl acetate (prepared in the foregoing manner), 100 ml. of 5 N sodium hydroxide and 100 ml. of ethanol was stirred and refluxed for 3 hours. After evaporating the ethanol in vacuo, the precipitated sodium 2,5-dibenzyloxyphenolate was filtered off. The product was washed with ether to remove starting material, and had the following structural formula:

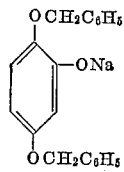

A sample of the sodium 2,5-dibenzyloxyphenolate was slurried with dilute hydrochloric acid, refiltered, and then recrystallized from ethanol to yield 2,5-dibenzyloxyphenol as pink-white crystals which melted at 92–95° C., and gave the following analysis:
Calculated: C, 78.5; H, 5.9. Found: C, 78.3; H, 6.1.

It will be appreciated that other useful compounds within the scope of Formula A, e.g., sodium 2,5-dibenzyloxy - 4 - methyl-phenolate, sodium 3,4-dibenzyloxy-phenolate, sodium 2,5 - dibenzyloxy-3,4-dimethylphenolate, etc., may be prepared utilizing the procedure set forth in Example 1, i.e., by substituting the appropriate reactants in the proper amounts. For example, to prepare sodium 2,5-dibenzyloxy-4-methyl-phenolate, according to the procedure set forth in Example 1, 2,5-dihydroxy-4-methyl-acetophenone would replace acetylhydroquinone.

EXAMPLE 2

Preparation of 4′-nitrophenylpropoxy-2,5-dibenzyloxy-benzene

A mixture of 32.8 grams of sodium 2,5-dibenzyloxyphenolate (prepared as described in Example 1), 24.4 grams of p-nitrophenylpropyl bromide (reference: W. Davis, J. J. Roberts and W. C. J. Ross, Journal of the Chemical Society, 1955, p. 894), 350 cc. of water and 500 cc. of ethanol was refluxed 18.5 hours and allowed to cool. The precipitate that separated was filtered off and crystallized from 5.5 liters of ethanol, to yield 27.0 grams of near-white needles which melted at 108–110° C. A second crop of crystals was obtained by concentrating the mother liquor to 500 cc. and cooling, to yield 4.5 grams of 4′-nitrophenylpropoxy-2,5-dibenzyloxy-benzene as near-white needles, which melted at 98–101° C. The total precipitated product was 31.5 grams (67% yield). A sample was dried in vacuum at 100° C., and gave the following analysis:
Calculated: C, 74.3; H, 5.8; N, 3.0. Found: C, 74.1; H, 5.8; N, 3.2.

EXAMPLE 3

Preparation of 4′-nitrophenylpropoxy-hydroquinone

To a gently boiling solution of 15 grams of 4′-nitrophenylpropoxy-2,5-dibenzyloxy-benzene (prepared as described in Example 2) in 150 cc. of acetic acid was slowly added 35 cc. of concentrated hydrochloric acid. The reaction mixture was refluxed for 20 minutes after adding the acetic acid, then poured into a liter of ice water. A brown gummy solid separated and was filtered off, and washed free of benzyl chloride with hexane. The resulting solid was crystallized from 300 ml. of toluene to yield 5.5 grams (62% yield) of 4′-nitrophenylpropoxy-hydroquinone as yellow crystals which melted at 151–153° C. A sample of the crude product, recrystallized from toluene, melted at 155–157° C., and had the following structural formula:

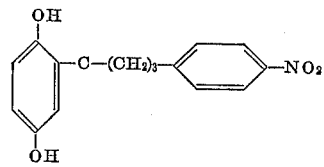

A sample was dried in vacuum at 100° C., and gave the following analysis:
Calculated: C, 62.3; H, 5.2; N, 4.8. Found: C, 62.4; H, 5.2; N, 5.0.

EXAMPLE 4

Preparation of 4′-nitrophenylpropoxy-2,5-diacetoxy-benzene

A mixture of 1 gram of 4′-nitrophenylpropoxy-hydroquinone (prepared as described in Example 2), 10 cc. of acetyl chloride and 2 drops of concentrated sulfuric acid was refluxed for one hour. The reaction mixture was quenched in ice water, filtered and desiccated in vacuum over KOH. The precipitated product was recrystallized from isopropyl alcohol to give a 54% yield of 4′-nitrophenylpropoxy-2,5-diacetoxy-benzene as yellow crystals which melted at 92–95° C., and had the following structural formula:

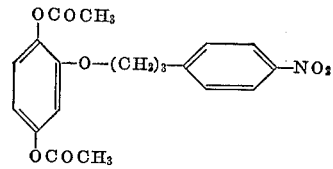

A sample was dried in vacuum at 80° C., and gave the following analysis:
Calculated: C, 61.3; H, 5.1; N, 3.8. Found: C, 61.1; H, 5.2; N, 3.8.

EXAMPLE 5

Preparation of 4'-aminophenylpropoxy-2,5-diacetoxy-benzene hydrochloride

A mixture of 4.2 grams of 4'-nitrophenylpropoxy-2,5-diacetoxy-benzene (prepared as described in Example 4), 150 ml. of ethyl acetate and 3 grams of 10% palladium-on-charcoal was hydrogenated in the Parr shaker at room temperature. Hydrogen uptake was complete in three minutes. The catalyst was filtered off, and 1.2 cc. of concentrated hydrochloric acid were added to the filtrate. The resulting product was precipitated from ethanol, washed with dilute ether, and the crude product was recrystallized from an ethanol-ether solution and desiccated in high vacuum over KOH and $P_2O_5$ to give 2.5 grams (59% yield) of 4'-aminophenylpropoxy-2,5-diacetoxy-benzene as white crystals which melted at 138–140° C., and had the following structural formula:

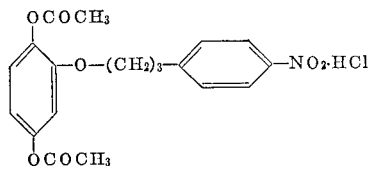

A sample was dried in vacuum at 80° C. and gave the following analysis:

Calculated: C, 60.1; H, 5.8; Cl, 9.3. Found: C, 60.0; H, 5.8; Cl, 9.2.

4'-aminophenylpropoxy-hydroquinone is prepared by hydrogenation, e.g., in the presence of a palladium-barium sulfate catalyst, i.e., by following the hydrogenation step in Example 5, of 4'-nitrophenylpropoxyhydroquinone (prepared as described in Example 3). In the alternative, 4'-aminophenylpropoxy-hydroquinone may be prepared by the hydrolysis of 4'-aminophenylpropoxy-2,5-diacetoxy-benzene (prepared in Example 5).

The compounds of Formula G may also be prepared by reduction of the nitro intermediate of Formula D, e.g., 4'-nitrophenylpropoxy-hydroquinone may be reduced to the corresponding amino compound. One may also obtain the compounds of Formula G by reductive dearalkylation simultaneously with reduction of the nitro group in compounds of Formula C. Although the procedure set forth in the specific examples given above involves several additional steps, that process is preferred because it minimizes the formation of undesired by-products, yielding the desired compound in highly pure form. The avoidance of by-products is particularly desirable since some of the by-products may be difficult to remove and, if allowed to remain, would tend to have adverse effects upon the storage stability of the product.

As heretofore noted, the compounds of Formula G are useful as silver halide developing agents. They may be utilized as silver halide developing agents in the manner disclosed in our U.S. Patent No. 3,061,434, issued Oct. 30, 1962.

The novel compounds of this invention cannot be made using the process disclosed in our above-noted U.S. Patent No. 3,061,434, as the alkoxy bridge —O—X— of the instant compounds would be cleaved during the demethylation step in the prior art synthesis. The present invention uses aralkoxy, e.g., benzyloxy, groups which are selectively cleaved to the hydroxyl group in the hydrolysis step 2, thus allowing the alkoxy group to remain throughout the process.

As previously mentioned, the diacyloxy compounds of Formula F are highly useful chemical intermediates. They are especially useful in reactions wherein it is desired that reaction be restricted to the amino group, and also where it is desired that the hydroxyl groups be protected during reaction and yet be readily regenerated after the reaction is completed. The diacyloxy compounds of Formula F may also be prepared by selective acylation of the compounds of Formula G in a manner analogous to that described in U.S. Patent No. 3,019,254, issued to Green et al. on Jan. 30, 1962.

In particular, the compounds of Formula F are highly useful as intermediates in the preparation of azo dye developers, as they may be readily diazotized and coupled into appropriate azo couplers, in a manner analogous to that disclosed in the copending application of Elkan R. Blout, Milton Green and Howard G. Rogers, Ser. No. 145,978, filed Oct. 18, 1961, now U.S. Patent 3,134,764, issued May 26, 1964. Thus, for example, p-amino-phenoxypropyl-hydroquinone-O,O' - diacetate hydrochloride was diazotized and coupled into 4-butoxy-1-naphthol, and the resulting solid hydrolyzed with alcoholic KOH under nitrogen to form p-(1-hydroxy-4-butoxy-2-naphthylazo)-phenylpropoxy-hydroquinone:

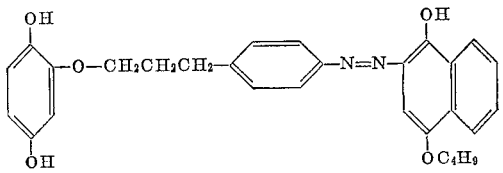

Since certain changes may be made in the above processes, products and compositions without departing from the scope of the invention herein involved, it is intended that all matter contained in the above description shall be interpreted as illustrative and not in a limiting sense.

What is claimed is:

1. A chemical compound of the formula:

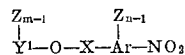

wherein Ar is an aryl nucleus selected from the class consisting of benzene and naphthalene nuclei; each Z is selected from the group consisting of lower alkyl and chlorine groups; $m$ is 1 to 4, inclusive; $n$ is 1 to 5, inclusive; X is an alkylene group containing from 2 to 6 carbons; and $Y^1$ is selected from the group consisting of para-dibenzyloxy phenyl and ortho-dibenzyloxy phenyl.

2. 4'-nitrophenylpropoxy-2,5-dibenzyloxy-benzene.
3. 4' - nitrophenylpropoxy - 2,5-dibenzyloxy-4-methyl-benzene.
4. 4'-nitrophenylpropoxy-3,4-dibenzyloxy-benzene.
5. A chemical compound of the formula:

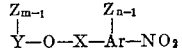

wherein Ar is an aryl nucleus selected from the class consisting of benzene and naphthalene nuclei; each Z is selected from the group consisting of lower alkyl and chlorine groups; $m$ is 1 to 4, inclusive; $n$ is 1 to 5, inclusive; X is an alkylene group containing from 2 to 6 carbons; and Y is selected from the group consisting of para-dihydroxy phenyl and ortho-dihydroxy phenyl.

6. 4'-nitrophenylpropoxy-hydroquinone.
7. 4'-nitrophenylpropoxy-4-methyl-hydroquinone.
8. 4'-nitrophenylpropoxy-3,4-dihydroxy-benzene.
9. A chemical compound of the formula:

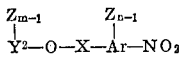

wherein Ar is an aryl nucleus selected from the class consisting of benzene and naphthalene nuclei; each Z is selected from the group consisting of lower alkyl and chlorine groups; $m$ is 1 to 4, inclusive; $n$ is 1 to 5, inclusive; X is an alkylene group containing from 2 to 6 carbons; and Y is selected from the group consisting of para-diacyloxy phenyl and ortho-diacyloxy phenyl; said acyloxy groups being represented by:

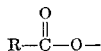

wherein R is selected from the group consisting of lower alkyl and phenyl groups.

10. 4'-nitrophenylpropoxy-2,5-diacetoxy-benzene.

11. 4'-nitrophenylpropoxy-2,5-diacetoxy-4-methyl-benzene.
12. 4'-nitrophenylpropoxy-3,4-diacetoxy-benzene.
13. A chemical compound of the formula:

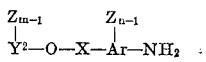

wherein Ar is an aryl nucleus selected from the class consisting of benzene and naphthalene nuclei; each Z is selected from the group consisting of lower alkyl and chlorine groups; $m$ is 1 to 4, inclusive; $n$ is 1 to 5, inclusive; X is an alkylene group containing from 2 to 6 carbons; and $Y^2$ is selected from the group consisting of para-diacyloxy phenyl and ortho-diacyloxy phenyl; said acyloxy groups being represented by:

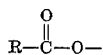

wherein R is selected from the group consisting of lower alkyl and phenyl groups.

14. 4'-aminophenylpropoxy-2,5-diacetoxy-benzene.
15. 4'-aminophenylpropoxy-2,5-diacetoxy-4-methyl-benzene.
16. 4'-aminophenylpropoxy-3,4-diacetoxy-benzene.
17. A chemical compound of the formula:

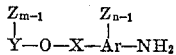

wherein Ar is an aryl nucleus selected from the class consisting of benzene and naphthalene nuclei; each Z is selected from the group consisting of lower alkyl and chlorine groups; $m$ is 1 to 4, inclusive; $n$ is 1 to 5, inclusive; X is an alkylene group containing from 2 to 6 carbons; and Y is selected from the group consisting of para-dihydroxy phenyl and ortho-dihydroxy phenyl.

18. 4'-aminophenylpropoxy-hydroquinone.
19. 4'-aminophenylpropoxy-4-methyl-hydroquinone.
20. 4'-aminophenylpropoxy-3,4-dihydroxy-benzene.

References Cited

UNITED STATES PATENTS

| | | | |
|---|---|---|---|
| 2,955,038 | 10/1960 | Smith | 260—613 |
| 3,009,958 | 11/1961 | Green et al. | 260—479 |
| 3,019,254 | 1/1962 | Green et al. | 260—479 |
| 3,022,354 | 2/1962 | Green et al. | 260—613 |
| 3,061,434 | 10/1962 | Green et al. | 260—479 |
| 3,142,564 | 7/1964 | Blout et al. | 260—571 |

FOREIGN PATENTS 853,482  11/1960  Great Britain.

LORRAINE A. WEINBERGER, *Primary Examiner.*

M. G. BERGER, *Assistant Examiner.*

U.S. Cl. X.R.

260—476, 613, 571, 592, 197